(12) United States Patent
Liu et al.

(10) Patent No.: US 11,513,856 B2
(45) Date of Patent: Nov. 29, 2022

(54) METHOD, DEVICES AND COMPUTER PROGRAM PRODUCTS FOR RESOURCE USAGE

(71) Applicant: EMC IP Holding Company LLC, Hopkinton, MA (US)

(72) Inventors: Bing Liu, Tianjin (CN); Tao Chen, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 450 days.

(21) Appl. No.: 16/863,167

(22) Filed: Apr. 30, 2020

(65) Prior Publication Data
US 2021/0117237 A1 Apr. 22, 2021

(30) Foreign Application Priority Data
Oct. 17, 2019 (CN) .......................... 201910989431.8

(51) Int. Cl.
*G06F 9/50* (2006.01)

(52) U.S. Cl.
CPC .................................. *G06F 9/5027* (2013.01)

(58) Field of Classification Search
None
See application file for complete search history.

(56) References Cited

U.S. PATENT DOCUMENTS

| | | | |
|---|---|---|---|
| 8,095,756 B1 * | 1/2012 | Somavarapu | G06F 11/1461 711/163 |
| 9,501,321 B1 * | 11/2016 | Sharifi | G06F 9/4881 |
| 9,560,405 B2 * | 1/2017 | McClure | H04N 21/439 |
| 9,588,813 B1 * | 3/2017 | Dubey | G06F 11/302 |
| 10,013,288 B2 * | 7/2018 | Kuraishi | G06F 9/5038 |
| 10,754,697 B2 * | 8/2020 | Kurian | G06F 9/5072 |
| 10,802,879 B2 * | 10/2020 | Chou | G06F 9/5011 |
| 10,831,545 B2 * | 11/2020 | Rao Kotha | G06F 11/1451 |
| 2018/0239640 A1 * | 8/2018 | Mizutani | G06F 9/5016 |
| 2019/0235921 A1 * | 8/2019 | Kurian | G06F 9/5072 |
| 2019/0370070 A1 * | 12/2019 | Houlbert | G06F 9/52 |
| 2020/0081992 A1 * | 3/2020 | Lynch | G06F 9/5027 |

OTHER PUBLICATIONS

Will, B. et al., "Intel® QuickAssist Technology & OpenSSL—1.1. 0: Performance" Network Security Content Delivery Networks, Web Servers, Load Balancing, Intel, 2017 (12 pages).

* cited by examiner

*Primary Examiner* — Hiren P Patel
(74) *Attorney, Agent, or Firm* — Chamberlain, Hrdlicka, White, Williams & Aughtry

(57) ABSTRACT

Embodiments of the present disclosure relates to managing resources. The embodiment include receiving a first request from a first application to process first data using a target resource and a second request from a second application to process second data using the target resource and determining a first quantity and a second quantity based on the first request and the second request, the first quantity indicating an amount of data in the first data to be processed using the target resource, the second quantity indicating an amount of data in the second data to be processed using the target resource. The method further comprises causing the first application to process the first quantity of data in the first data using the target resource and causing the second application to process the second quantity of data in the second data using the target resource.

16 Claims, 5 Drawing Sheets

METHOD, DEVICES AND COMPUTER PROGRAM PRODUCTS FOR RESOURCE USAGE

CROSS-REFERENCE TO RELATED APPLICATIONS

This application claims priority to Chinese Application No. 201910989431.8 filed on Oct. 17, 2019. Chinese Application No. 201910989431.8 is hereby incorporated by reference in its entirety.

FIELD

Embodiments of the present disclosure relate to the field of data storage, and more specifically, to methods, electronic devices and computer program products for resource usage.

BACKGROUND

Various storage systems and devices are increasingly used. In some storage systems, in addition to traditional data storage and backup, other types of tasks are added so as to better utilize stored data. Such added tasks (e.g., compression) might be computationally intensive. In a storage device such as Data Domain Restorer (DDR), auxiliary means may be employed to accelerate such computationally intensive tasks. For example, Intel QuickAssist technology (QAT) may be used.

In such a storage or backup system, without Quality of Service (QoS) strategy, high priority business might be unexpectedly degraded. Furthermore, without good QoS, the use of the auxiliary means will also face more challenges.

SUMMARY

Embodiments of the present disclosure provide a solution for resource usage.

In a first aspect of the present disclosure, a method of resource usage is provided. The method comprises receiving a first request from a first application to process first data using a target resource and a second request from a second application to process second data using the target resource. The method further comprises determining a first quantity and a second quantity based on the first request and the second request, the first quantity indicating an amount of data in the first data to be processed using the target resource, the second quantity indicating an amount of data in the second data to be processed using the target resource. The method further comprises causing the first application to process the first quantity of data in the first data using the target resource. The method further comprises causing the second application to process the second quantity of data in the second data using the target resource.

In a second aspect of the present disclosure, a method of resource usage is provided. The method comprises determining a target quantity in response to receiving a request from an application to process data using a target resource, the target quantity indicating an amount of data to be processed by the application using the target resource. The method further comprises determining demands on the target resource of a plurality of operations associated with the application. The method further comprises allocating the target quantity of data among the plurality of operations based on the demands and the target resource.

In a third aspect of the present disclosure, an electronic device is provided. The device comprises a processor and a memory coupled to the processor, the memory having instructions stored thereon when executed by the processor causing the device to perform acts. The acts comprise receiving a first request from a first application to process first data using a target resource and a second request from a second application to process second data using the target resource. The acts further comprise determining a first quantity and a second quantity based on the first request and the second request, the first quantity indicating an amount of data in the first data to be processed using the target resource, the second quantity indicating an amount of data in the second data to be processed using the target resource. The acts further comprise causing the first application to process the first quantity of data in the first data using the target resource. The acts further comprise causing the second application to process the second quantity of data in the second data using the target resource.

In a fourth aspect of the present disclosure, an electronic device is provided. The device comprises a processor and a memory coupled to the processor, the memory having instructions stored thereon when executed by the processor causing the device to perform acts. The acts comprise determining a target quantity in response to receiving a request from an application to process data using a target resource, the target quantity indicating an amount of data to be processed by the application using the target resource. The acts further comprise determining demands on the target resource of a plurality of operations associated with the application. The acts further comprise allocating the target quantity of data among the plurality of operations based on the demands and the target resource.

In a fifth aspect of the present disclosure, a computer program product is provided. The computer program product is tangibly stored on a computer-readable medium and comprises machine-executable instructions which, when executed, cause the machine to perform a method according to the first aspect of the present disclosure.

In a sixth aspect of the present disclosure, a computer program product is provided. The computer program product is tangibly stored on a computer-readable medium and comprises machine-executable instructions which, when executed, cause the machine to perform a method according to the second aspect of the present disclosure.

The Summary is to introduce a selection of concepts in a simplified form that are further described below in the Detailed Description. This Summary is not intended to identify key features or essential features of the present disclosure, nor is it intended to limit the scope of the present disclosure.

BRIEF DESCRIPTION OF THE DRAWINGS

Through the following more detailed description of the example embodiments of the present disclosure with reference to the accompanying drawings, the above and other objectives, features and advantages of the present disclosure will become more apparent, wherein the same reference sign generally refers to the same component in the example embodiments of the present disclosure. In the drawings.

DETAILED DESCRIPTION OF IMPLEMENTATIONS

Figure 1:
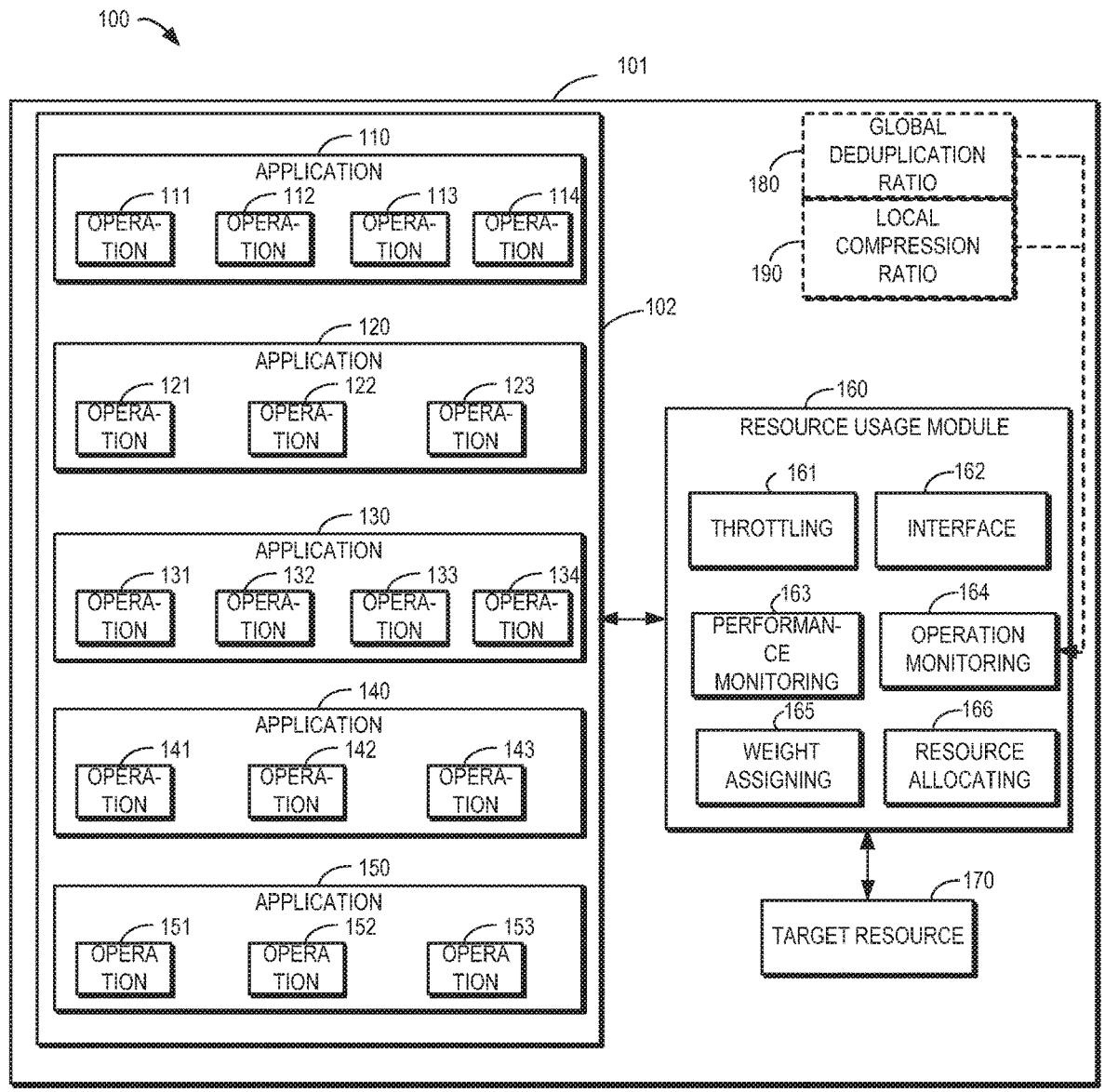
FIG. 1 shows a schematic view of an example environment in which embodiments of the present disclosure can be implemented.

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and thus implement the present disclosure and is not intended to limit the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least a further embodiment." The terms "first", "second" and so on may refer to same or different objects. The following text also can comprise other explicit and implicit definitions.

As mentioned above, in some storage systems, auxiliary resources may be employed to accelerate the processing of computationally intensive applications. Current solutions lack a QoS strategy for auxiliary resources such as QAT resources but allocate QAT resources according to requests of various applications, or in other words, use the QAT resources to accelerate the requested amount of data. When QAT resources have a heavy workload and fail to satisfy the requested amount, the application has to wait until the request is satisfied.

Without a QoS strategy for auxiliary resources, some important applications such as deduplication applications might be affected when the workload is heavy. The following section describes an exemplary deduplication system which includes the aforementioned problem. However, it should be understood that similar problems might also exist in other data storage or backup systems.

In a deduplication system, there are non-critical applications or processes such as Garbage Collection (GC) applications and migration to cloud applications. These non-critical applications also need auxiliary resources such as QAT to help computing such as compression and decompression. In fact, these non-critical applications might engage too many auxiliary resources and degrade the performance of the normal backup service. In order to provide backup/restoration services according to a Service Level Agreement (SLA), it is desirable to allocate more QAT resources to backup service applications with high priorities.

As mentioned above, in the field of data storage, traditional data storage or backup has been extended to secondary storage. In addition to backup and restoration, there are additional use cases including Instant Access, Instant Restore and even background big data analysis on secondary storage. These new applications need to be considered in the QoS design for QAT. Therefore, for the secondary storage, it is necessary to determine the priorities of these new applications and provide QAT resources based on their priorities.

In addition, an application in a deduplication system generally includes different stages of computationally intensive tasks. Taking normal backup as an example, its pipeline includes three stages including Secure Hash Algorithm 1 (SHA1), compression and encryption. In theory, the performance of one pipeline depends on the slowest stage. This means that using more QAT resources for a quick stage makes little sense. Therefore, there is a need to monitor different stages in a pipeline and balance these stages by QAT resources adaptive assignment.

The present disclosure provides a solution for resource usage to at least eliminate one or more of the above drawbacks. FIG. 1 shows a schematic view of an example environment 100 in which embodiments of the present disclosure may be implemented. A plurality of applications 110-150 are running on a storage system 101 (such as a deduplication system) as shown in FIG. 1. Each of the plurality of applications 110-150 is associated with a plurality of different operations. As shown, the application 110 comprises operations 111-114, the application 120 comprises operations 121-123, the application 130 comprises operations 131-134, the application 140 comprises operations 141-143, and the application 150 comprises operations 151-153. The applications 110-150 may be collectively referred to as an application 102 hereinafter. The number of applications and the number of operations associated with applications as shown in FIG. 1 are merely exemplary without limitation.

Operations here may refer to different stages which are included in the pipeline of a corresponding application for processing data. The terms "stages" and "operations" may be used interchangeably herein. As an example, where the application 110 is a backup application, the operation 111 may be SHA 1, the operation 112 may be compression, the operation 113 may be encryption, and the operation 114 may be input and output TO. As another example, where the application 120 is a data restore application, the operation 121 may be TO, the operation 122 may be decryption, and the operation 123 may be decompression. As a further example, where the application 130 is a big data analysis application, the operation 131 may be TO, the operation 132 may be decryption, the operation 133 may be decompression, and the operation 134 may be analysis or computing. The storage system 101 may further comprise other types of applications, such as the GC application and migration application, e.g., migration to cloud application, etc.

The applications 110-150 may request use of a target resource 170 for assisting data processing, e.g., accelerating processing of data, especially accelerating computationally intensive tasks. The target resource 170 as described herein may be any resource that may be used by an application or process in the storage system 101 to assist data processing, e.g., a resource for accelerating data processing. The target resource 170 may be a resource in the form of software, hardware or a combination thereof. In some embodiments, the target resource 170 may be a processor for accelerating data processing, such as a QAT chip, etc.

A resource usage module 160 comprising a plurality of sub-modules 161-166 may coordinate the use of the target resource 170 among at least some of the applications 110-150. Alternatively, or additionally, the resource usage module 160 may further coordinate the use of the target resource 170 among various stages of a pipeline or various operations of the application 102. In some embodiments, the resource usage module 160 may utilize some parameters of the storage system 101, such as a global deduplication ratio 180 and a local compression ratio 190, as described further below.

It should be understood that dividing the resource usage module 160 into a plurality of sub-modules 161-166 performing different functions is merely for the purpose of illustration and not intended to be limiting. In some embodiments, the resource usage module 160 may comprise more or less sub-modules. Although the resource usage module 160 is shown within the storage system 101, it should be understood that the resource usage module 160 may also be implemented independently of the storage system 101, in which case the resource usage module 160 may communicate with the storage system 101 in any appropriate manner so as to implement the resource usage solution proposed by the present disclosure. In addition, allocating more resources to an application or similar expressions may mean causing the application to use the target resources to process a larger amount of data than another application.

In the present disclosure, it is proposed to design a QoS strategy for target resources (such as QAT resources) from two dimensions, i.e., balance the use of target resources. From the perspective of the individual application dimension (also referred to as a horizontal dimension) of the storage system 101, priorities of different applications (e.g., the applications 110-150)/customers may be determined, and more resources may be allocated to an application for the critical service in the storage system 101. For example, backup/restore applications may be allocated with more resources than Garbage Collection/migration to Cloud applications.

On the other hand, from the perspective of the individual operation dimension (also referred to as a vertical dimension) of the same application, the application 102 may generally include a plurality of computationally intensive stages (also referred to as operations herein) in one pipeline, such as SHA1, compression and encryption mentioned above. In theory, performance of the whole pipeline depends on the slowest stage (so-called "shortboard"). Therefore, the QoS strategy may be used for different stages in the pipeline, so that the use of target resources can be balanced between different stages. In aspects of the present disclosure, the QoS strategy of the two dimensions may be used separately or in combination.

In embodiments of the present disclosure, with a balance between different applications, more auxiliary resources may be allocated to an application with a higher priority or higher importance, e.g., a backup/restore application, thereby improving the user experience. On the other hand, with a balance between different operations or stages of an application, more auxiliary resources may be utilized to promote a "shortboard" operation or stage, so that the performance of the whole pipeline can be improved. In addition, by taking into account traditional backup and new data analysis use cases, the resource usage solution proposed by the present disclosure can support both traditional backup and secondary storage.

Figure 2:
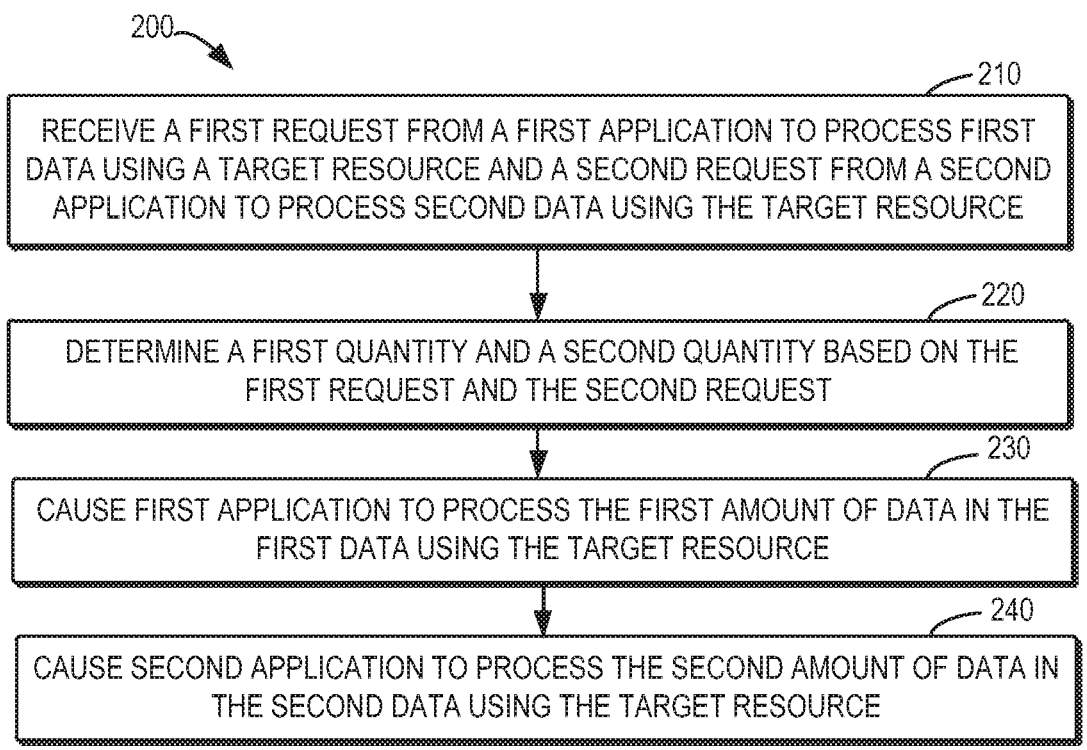
FIG. 2 shows a flowchart of a process of resource usage according to some embodiments of the present disclosure.

With reference to FIGS. 2 to 5, a detailed description of embodiments of the present disclosure is presented below. FIG. 2 shows a flowchart of a resource usage process 200 according to some embodiments of the present disclosure. For the ease of discussion, the process 200 will be described in conjunction with FIG. 1. In such an example, the process 200 may be implemented by the resource usage module 160.

At block 210, the resource usage module 160 receives a first request from a first application to process first data using the target resource 170 and a second request from a second application to process second data using the target resource 170. For example, the resource usage module 160 may, for example within a period of time, obtain requests of the applications 110 and 120 for target resources. For the purpose of illustration, the application 110 is used as an example of the first application, and the second application 120 is used as an example of the second application.

The first request may comprise the amount of data, which may also be referred to as the total amount of the first data, to be processed using the target resource 170 as requested by the first application 110. For example, the first application 110 may request using the target resource 170 to accelerate the processing of 100 data segments. Similarly, the second request may comprise the amount of data, which may also be referred to as the total amount of the second data, to be processed using the target resource 170 as requested by the second application 120. For example, the second application 120 may request to use the target resource 170 to accelerate the processing of 50 data segments.

In some embodiments, the resource usage module 160 may receive requests for the target resource 170 from more applications. For example, the resource usage module 160 may receive requests for the target resource 170 from one or more of the applications 130-150.

At block 220, the resource usage module 160 determines a first quantity and a second quantity based on the received first request and second request. The first quantity indicates the amount of data in the first data to be processed using the target resource 170, and the second quantity indicates the amount of data in the second data to be processed using the target resource 170.

The first quantity might be less than the total amount of the first data as requested by the first application 110. For example, where the total amount of the first data is 100 data segments, the first quantity might be 80 data segments. Similarly, the second quantity might also be less than the total amount of the second data as requested by the second application 120. For example, where the total amount of the first data is 50 data segments, the first quantity might be 30 data segments. It should be understood that the term "data segment" used herein is merely an example unit describing the amount of data, and embodiments of the present disclosure may be applicable where any unit for amount of data is used.

In some embodiments, a traffic throttling mechanism may be applied. When the load of the target resource 170 is too heavy to process incoming requests, the resource usage module 160 may balance the use of the target resource 170 by different applications. For example, the resource usage module 160 (e.g., a throttling sub-module 161) may determine whether the utilization ratio of the target resource 170 exceeds a threshold utilization ratio. If the utilization ratio of the target resource 170 exceeds the threshold utilization ratio, the resource usage module 160 may determine the first quantity and the second quantity based on the first request and the second request. If the utilization ratio of the target resource 170 does not exceed the threshold utilization ratio, the resource usage module 160 may directly allocate the target resource 170 according to the amount of data as requested by the first application 110, the second application 120 and possibly other applications.

In some embodiments, the first quantity and the second quantity may be determined according to priorities. For example, priorities of the applications 110-150 may be preconfigured via an interface sub-module 162. Only as an example, the applications 110-150 may be divided into two priorities: high-priority and low-priority. Applications such as backup, restore and the like may be assigned with high-priority, and applications such as GC, migration and the like may be assigned with low-priority. Priorities of the applications 110-150 may be determined based on the SLA for example. The resource usage module 160 may tend to allocate more resources to the applications with high-priority. In other words, the resource usage module 160 may cause the applications with high-priority to utilize the target resource 170 to process more data than the applications with low-priority. If the first application 110 and the second application 120 have the same priority, then equal resources may be allocated to them.

In some embodiments, the amount of data to be processed using the target resource 170 by an individual application may be determined based on weights for the applications. For example, the resource usage module 160 may obtain a first weight for the first application 110 and a second weight for the second application 120. The resource usage module 160 may determine the total amount of the first data based on the first request and determine the total amount of the second data based on the second request. Then, the resource usage module 160 may determine the first quantity and the second quantity based on the first weight, the second weight, the total amount of the first data and the total amount of the second data.

Only as an example, it is assumed that the total amount of the first data as requested by the first application 110 is 100 data segments, and the total amount of the second data as requested by the second application 120 is 50 data segments. Based on the first weight and the second weight, the resource usage module 160 may determine, for example, that the first quantity is 80 data segments and the second quantity is 30 data segments.

The first weight, the second weight and possibly weights for other applications may be based on priorities of corresponding applications. For example, applications with the same priority may have equal weights. These weights may be based on applications per se. For example, a weight for a particular application may be configured independently of other applications.

In some embodiments, the weight for the application 102 may be adjusted based on the execution of the application 102, for example to enable a user to make flexible adjustment according to demands. The resource usage module 160 may monitor the execution performance of at least one of the first application 110 and the second application 120 and obtain the first weight and second weight updated based on the monitored execution performance. For example, the resource usage module 160 may monitor, through an operation performance monitoring sub-module 163, the execution performance of the first application 110, i.e., the processing of data performed by the first application 110, such as the storage amount of data, latency, etc.

In some embodiments, the resource usage module 160 may obtain a performance requirement on the first application 110 in any appropriate way and compare the monitored execution performance of the first application 110 with the performance requirement. The resource usage module 160 may further adjust the first weight and the second weight according to a result of the comparison. For example, if the execution performance of the first application 110 does not satisfy the performance requirement, the first weight may be increased, and the second weight may be reduced accordingly.

In some embodiments, the resource usage module 160 may provide the monitored execution performance to the user and receive updates to the first weight and the second weight from the user. For example, the resource usage module 160 may present the monitored execution performance of the first application 110 to the user via the interface sub-module 162. The user may determine based on SLA whether to adjust the first weight, the second weight and possibly other weights. The resource usage module 160 may receive update to a weight by the user via the interface sub-module 162 and determine the updated weight via a weight assigning sub-module 165.

Where the weight for an application is based on the priority of the application, the adjustment of the weight for the application may be adjustment of a weight associated with the priority. For example, where applications are divided into high-priority and low-priority, the weight for the high-priority and the weight for the low-priority may be adjusted. It should be understood that although the above example embodiments have been described with respect to the first application 110, the resource usage module 160 may monitor the execution performance of any application.

Still with reference to FIG. 2, at block 230, the resource usage module 160 causes the first application 110 to process the first quantity of data in the first data using the target resource 170. At block 240, the resource usage module 160 causes the second application 120 to process the second quantity of data in the second data using the target resource 170. For example, continuing with the above example where the first quantity is determined as 80 data segments and the second quantity is determined as 30 data segments, the resource usage module 160 may cause, via the resource assigning sub-module 166, the first application 110 to accelerate the processing of 80 data segments using the target resource 170 and cause the second application 120 to accelerate the processing of 30 data segments using the target resource 170.

In such embodiments, through a balance between different applications, more auxiliary resources (e.g., QAT resources) may be allocated to an application with higher-priority or higher importance, such as the backup/restore application. In other words, critical applications such as backup or restore and the like may utilize auxiliary resources to accelerate the processing of more data. In this way, the user experience and efficiency of the storage system may be improved.

Figure 3:
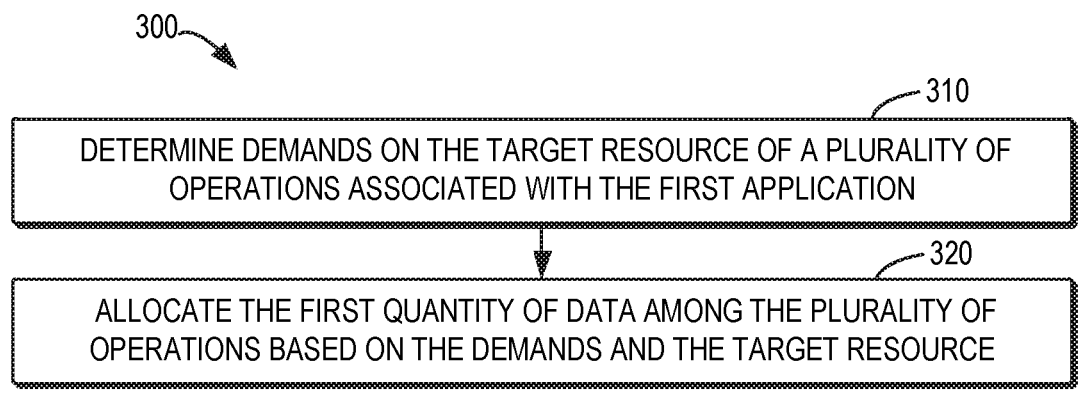
FIG. 3 shows a flowchart of a process of resource usage according to some embodiments of the present disclosure.

As mentioned above, alternatively or additionally, the use of auxiliary resources may be further balanced between different operations or stages of the same application. FIG. 3 shows a flowchart of a process 300 of resource usage according to some embodiments of the present disclosure. For the ease of discussion, the process 300 will be described in conjunction with FIGS. 1, 4A and 4B. In such an example, the process 300 may be performed by the resource usage module 160. In addition, the balance between different operations may be performed on one or more of the applications 110-150, and the process 300 will be described with respect to the first application 110 only for the purpose of illustration. In some embodiments, the process 300 may be regarded as a specific implementation of block 230 of the process 200.

Figure 4A:
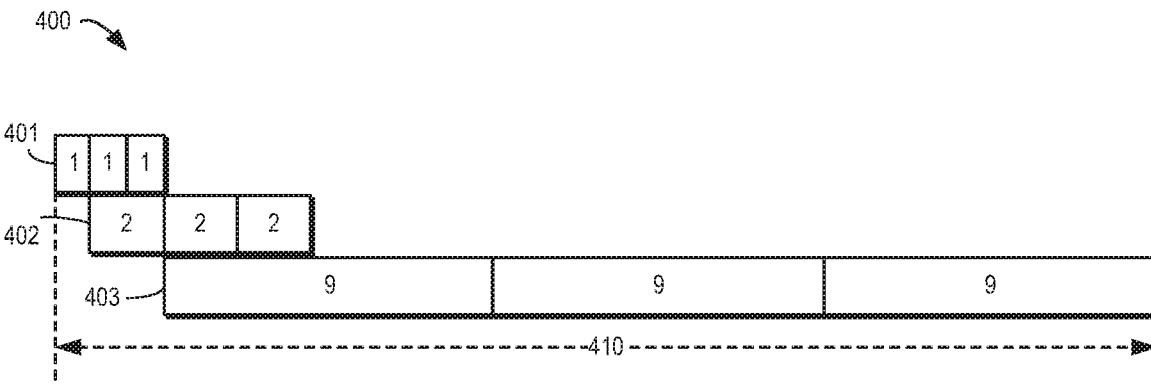
FIG. 4A shows a schematic view illustrating an imbalance between different operations.

Reference is first made to FIG. 4A to describe an execution model having a plurality of stages or operations. FIG. 4A shows a schematic view 400 illustrating an imbalance between different operations. In an example of FIG. 4A, there are three tasks or pipelines, and each pipeline needs to perform three operations 401, 402 and 403 successively. In other words, each pipeline comprises three stages, and costs (corresponding required computing resource or latency) of these three stages are 1, 2 and 9, respectively. For example, where the application as shown is data restore, the operations 401, 402 and 403 may correspond to IO, decryption and decompression, respectively.

Each following stage can only start after its previous stage finishes and provides output, which is generally referred to as the dependency between different stages. Therefore, in FIG. 4A, the total time of the three tasks needs "1+2+9× 3=30." As seen from FIG. 4A, there are still many pauses in the pipeline, so there is still room for optimization.

Reference is now made to FIG. 3. At block 310, the resource usage module 160 determines demands on the target resource 170 of a plurality of operations associated with the first application 110. For example, the resource usage module 160 may determine demands on the target resource 170 of the plurality of operations 111-114 via an operation monitoring sub-module 164. The demand on the target resource 170 of each of the plurality of operations 111-114 may be determined. These operations may be a plurality of operations to be performed successively, such as shown in FIG. 4A. In some embodiments, the demand on the target resource 170 of an operation or stage may be determined based on the time cost or required total resource cost of the operation or stage.

In some embodiments, the demand on the target resource 170 of an individual operation may be determined based on other metrics. For example, for an individual operation of the plurality of operations 111-114, the resource usage module 160 may determine the total amount of data processed by the individual operation and the throughput of the individual operation, and then determine the demand of the individual operation based on the determined total amount and throughput. The total amount of data processed by the individual operation may be determined based on the specific type of the operation. In case of compression or decompression, related global and local parameters need to be taken into account especially. For example, where the application 110 is a backup application, in determining demands on the target resource 170 of operations 112, 113 and 114, the global deduplication ratio 180 and/or local compression ratio 190 needs to be considered to determine the amount of data processed by a corresponding operation (due to deduplication and/or compression, the amount of data processed by two consecutive operations might be different).

At block 320, the resource usage module 160 allocates the first quantity of data (determined at block 220) to the plurality of operations 111-114 based on the determined demands and the target resource 170. For example, an allocation ratio may be determined based on the determined demand on the target resource 170 of each operation, and then the determined first quantity of data may be allocated to each of the plurality of operations 111-114 based on the allocation ratio.

As an example, continuing with the above example where the first quantity is determined as 80 data segments, the resource usage module 160 may determine based on the demand on the target resource 170 of each of the plurality of operations 111-114, that 10 data segments are allocated to the operation 111, 20 data segments are allocated to the operation 112, 40 data segments are allocated to the operation 113, and the remaining 10 data segments are allocated to the operation 114. In other words, during data processing, the operation 111 may utilize the target resource 170 to accelerate the processing of 10 data segments, the operation 112 may utilize the target resource 170 to accelerate the processing of 20 data segments, the operation 113 may utilize the target resource 170 to accelerate the processing of 40 data segments, and the operation 114 may utilize the target resource 170 to accelerate the processing of 10 data segments.

The following section describes an example of how to balance different operations or stages through allocation among different operations or stages in accordance with various embodiments of the invention. The example is not intended to limit the scope of the invention. In this example, the application is a deduplication application, and the target resource is a QAT resource. First, a "shortboard" stage or operation of a pipeline, which will take larger computing costs or time, is determined via the operation monitoring sub-module 164. Second, specific to the deduplication application, the amount of data processed by each stage or operation is different from each other because of the operations of global deduplication and local compression. Therefore, it is necessary to determine the global deduplication ratio and local compression ratio and estimate the workload for each stage. The demand on QAT resources of each stage may be obtained along with statistics of the throughput of each stage. For example, a proportion of QAT resources allocated to each stage may be obtained. Finally, based on the demand or proportion of demand on the QAT resource as obtained in the previous step, the resource usage module 160 may adaptively adjust the weight for each stage in order to allocate proportional QAT resources to each stage, thereby balancing each stage in one pipeline.

Figure 4B:
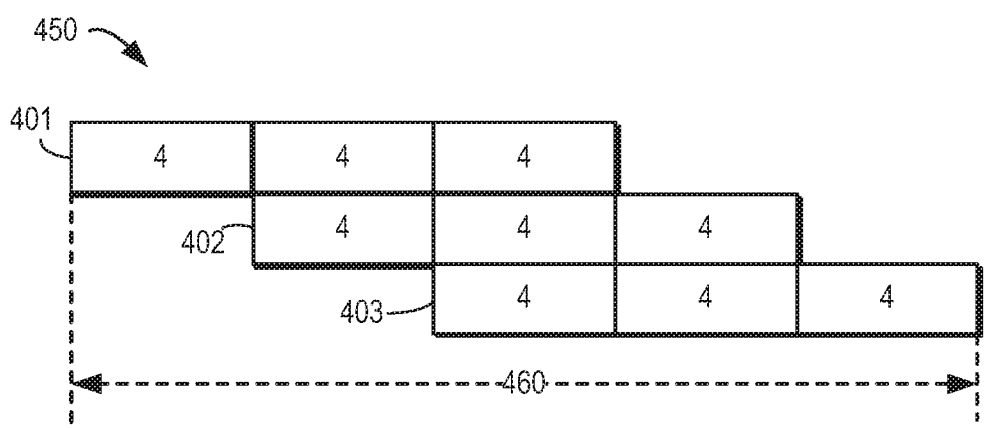
FIG. 4B shows a schematic view illustrating a balance between different operations according to some embodiments of the present disclosure.

FIG. 4B shows a schematic view 450 illustrating a balance between different operations according to some embodiments of the present disclosure. In FIG. 4B, the use of the target resource 170 has been balanced between operations 410, 420 and 430, as described with reference to the process 300. Improvement in balanced results can be seen from FIG. 4B. The total costs of the three tasks are the same, i.e., 12×3. The cost of one pipeline becomes 4×3 instead of 1+2+9. The cost of each operation is 4. Therefore, when these pipelines run, no stall will occur. The total time cost of the three tasks is "4+4+4×3=20." Therefore, benefits of a balance between different operations can be seen as compared with FIG. 4A.

In such embodiments, through a balance between different operations or stages of an application, more auxiliary resources may be used to promote the "shortboard" operation or stage, so that the performance of the whole pipeline can be improved.

Figure 5:
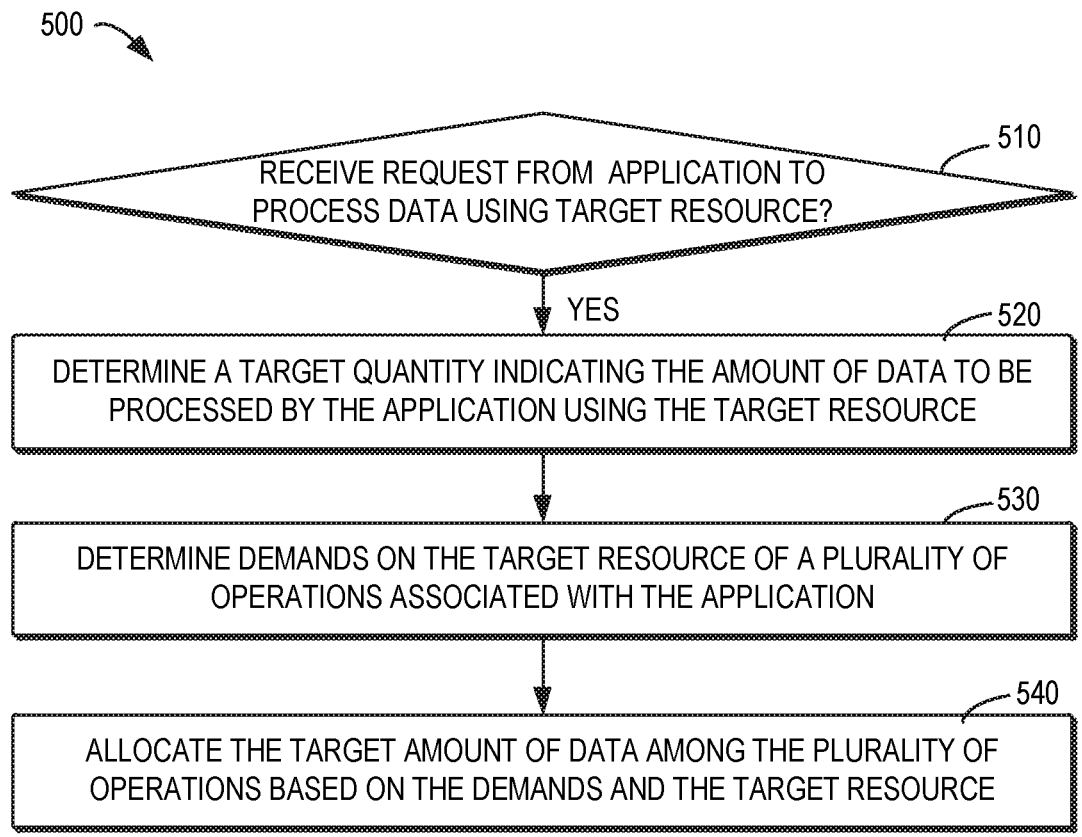
FIG. 5 shows a flowchart of a process of resource usage according to some embodiments of the present disclosure.

The balance solution for inter-application and balance solution for inter-operation as proposed herein may be used separately or in combination. FIG. 5 shows a flowchart of a process 500 of resource usage according to some embodiments of the present disclosure. For the ease of discussion, the process 500 will be described in conjunction with FIG. 1. In such examples, the process 500 may be performed by the resource usage module 160.

At block 510, the resource usage module 160 determines whether a request from an application to process data using the target resource 170 is received. If a request from a certain application (e.g., the application 130) is received, then the process 500 proceeds to block 520.

At block 520, the resource usage module 160 determines a target quantity, which indicates the amount of data to be processed by the application 130 using the target resource 170. In some embodiments, the target quantity may be the total amount of data to be processed as requested by the application 130. That is, in such embodiments, the balance solution for inter-operation is used separately. In some embodiments, the target quantity may be determined in the way as described with reference to block 220.

At block 530, the resource usage module 160 determines demands on the target resource 170 of a plurality of operations 131-134 associated with the application 130. The act performed at block 530 may be performed in the way as described with reference to block 310.

At block 540, the resource usage module 160 allocates the target quantity of data among the plurality of operations 131-134 based on the demands determined at block 530 and the target resource 170. The act performed at block 540 may be performed in the way as described with reference to block 320.

Description has been presented on how to balance the use of auxiliary resources such as QAT resources and the like among different applications (balance of horizontal dimension) and among different operations or stages of an application (balance of vertical dimension). In different aspects of the present disclosure, balances of the two dimensions may be used separately or in combination.

Figure 6:
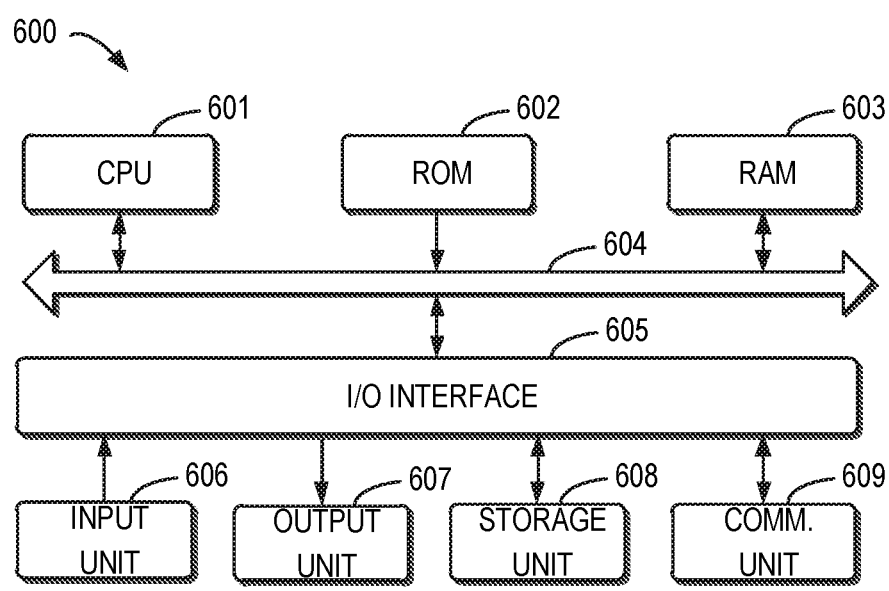
FIG. 6 shows a block diagram of an example device which can be used to implement embodiments of the present disclosure.

FIG. 6 is a schematic block diagram illustrating an example device 600 that can be used to implement embodiments of the present disclosure. As illustrated, the device 600 comprises a central processing unit (CPU) 601 which can perform various suitable acts and processing based on the computer program instructions stored in a read-only memory (ROM) 602 or computer program instructions loaded into a random-access memory (RAM) 603 from a storage unit 608. The RAM 603 also stores various types of programs and data required for the operation of device 600. CPU 601, ROM 602 and RAM 603 are connected to each other via a bus 604 to which an input/output (I/O) interface 605 is also connected.

A plurality of components in the device 600 are connected to the I/O interface 605, including: an input unit 606, such as a keyboard, mouse and the like; an output unit 607, such as a variety of types of displays, speakers and the like; a storage unit 608, such as a magnetic disk, optical disk and the like; and a communication unit 609, such as a network card, modem, wireless communication transceiver and the like. The communication unit 609 enables the device 600 to exchange information/data with other devices via a computer network such as the Internet and/or a variety of telecommunication networks.

The processing unit 601 performs various methods and processes as described above, for example, any of the processes 200, 300 and 500. For example, in some embodiments, any of the processes 200, 300 and 500 may be implemented as a computer software program or computer program product, which is tangibly included in a machine-readable medium, such as the storage unit 608. In some embodiments, the computer program can be partially or fully loaded and/or installed onto the device 600 via ROM 602 and/or the communication unit 609. When the computer program is loaded to RAM 603 and executed by CPU 601, one or more steps of any of the processes 200, 300 and 500 described above are performed. Alternatively, in other embodiments, CPU 601 may be configured to perform any of the processes 200, 300 and 500 in any other suitable manner (for example, by means of a firmware).

According to some embodiments of the present disclosure, there is provided a computer-readable medium. The computer-readable medium has a computer program stored thereon which, when executed by a processor, performs the method according to the present disclosure.

Those skilled in the art would understand that various steps of the above method of the disclosure may be implemented via general-purpose computing devices, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means of the apparatus have been mentioned in detailed description above, such partition is only an example, but not a limitation. Actually, according to the embodiments of the present disclosure, features and functions of two or more apparatuses described above may be embodied in one apparatus. By contrast, features and functions of one apparatus described above may be further partitioned to be embodied by various apparatuses.

What have been mentioned above are only some optional embodiments of the present disclosure and are intended to be limiting the present disclosure. For those skilled in the art, the present disclosure may have various modifications and changes. Any modifications, equivalents and improvements made within the spirits and principles of the present disclosure should be included within the scope of the present disclosure.

We claim:

1. A method of resource usage comprising:
receiving a first request from a first application to process first data using a target resource and a second request from a second application to process second data using the target resource;
determining a first quantity and a second quantity based on the first request and the second request, the first quantity indicating an amount of data in the first data to be processed using the target resource, the second quantity indicating an amount of data in the second data to be processed using the target resource, wherein determining the first quantity and the second quantity comprises:
obtaining a first weight for the first application and a second weight for the second application;
determining a total amount of the first data based on the first request;
determining a total amount of the second data based on the second request; and
determining the first quantity and the second quantity based on the first weight, the second weight, the total amount of the first data and the total amount of the second data;
causing the first application to process the first quantity of data in the first data using the target resource; and
causing the second application to process the second quantity of data in the second data using the target resource.

2. The method of claim 1, wherein obtaining the first weight and the second weight comprises:
monitoring execution performance of at least one of the first application and the second application; and obtaining the first weight and the second weight updated based on the execution performance.

3. The method of claim 2, wherein obtaining the first weight and the second weight updated based on the execution performance comprises:
providing the execution performance to a user; and
receiving from the user updates to the first weight and the second weight.

4. The method of claim 1, wherein determining the first quantity and the second quantity comprises:
determining whether a utilization ratio of the target resource exceeds a threshold utilization ratio; and
in response to determining that the utilization ratio exceeds the threshold utilization ratio, determining the first quantity and the second quantity based on the first request and the second request.

5. The method of claim 1, wherein causing the first application to process the first quantity of data using the target resource comprises:
determining demands on the target resource of a plurality of operations associated with the first application; and
allocating the first quantity of data among the plurality of operations based on the demands and the target resource.

6. The method of claim 5, wherein determining the demands comprises:
for an individual operation of the plurality of operations, determining total amount of data processed by the individual operation and a throughput of the individual operation; and
determining a demand of the individual operation based on the determined total amount and throughput.

7. An electronic device comprising:
a processor; and
a memory coupled to the processor, the memory having instructions stored thereon, when executed by the processor causing the device to perform a method, the method comprising:
receiving a first request from a first application to process first data using a target resource and a second request from a second application to process second data using the target resource;
determining a first quantity and a second quantity based on the first request and the second request, the first quantity indicating an amount of data in the first data to be processed using the target resource, the second quantity indicating an amount of data in the second data to be processed using the target resource, wherein determining the first quantity and the second quantity comprises:
obtaining a first weight for the first application and a second weight for the second application;
determining a total amount of the first data based on the first request;
determining a total amount of the second data based on the second request; and
determining the first quantity and the second quantity based on the first weight, the second weight, the total amount of the first data and the total amount of the second data;
causing the first application to process the first quantity of data in the first data using the target resource; and
causing the second application to process the second quantity of data in the second data using the target resource.

8. The electronic device of claim 7, wherein obtaining the first weight and the second weight comprises:

monitoring execution performance of at least one of the first application and the second application; and
obtaining the first weight and the second weight updated based on the execution performance.

9. The electronic device of claim 8, wherein obtaining the first weight and the second weight updated based on the execution performance comprises:
providing the execution performance to a user; and
receiving from the user updates to the first weight and the second weight.

10. The electronic device of claim 7, wherein determining the first quantity and the second quantity comprises:
determining whether a utilization ratio of the target resource exceeds a threshold utilization ratio; and
in response to determining that the utilization ratio exceeds the threshold utilization ratio, determining the first quantity and the second quantity based on the first request and the second request.

11. The electronic device of claim 7, wherein causing the first application to process the first quantity of data using the target resource comprises:
determining demands on the target resource of a plurality of operations associated with the first application; and
allocating the first quantity of data among the plurality of operations based on the demands and the target resource.

12. The electronic device of claim 11, wherein determining the demands comprises:
for an individual operation of the plurality of operations, determining total amount of data processed by the individual operation and a throughput of the individual operation; and
determining a demand of the individual operation based on the determined total amount and the throughput.

13. A non-transitory computer readable medium comprising computer readable program code, which when executed by a computer processor enables the computer processor to perform a method, the method comprising:
receiving a first request from a first application to process first data using a target resource and a second request from a second application to process second data using the target resource;
determining a first quantity and a second quantity based on the first request and the second request, the first quantity indicating an amount of data in the first data to be processed using the target resource, the second quantity indicating an amount of data in the second data to be processed using the target resource, wherein determining the first quantity and the second quantity comprises:
obtaining a first weight for the first application and a second weight for the second application;
determining a total amount of the first data based on the first request;
determining a total amount of the second data based on the second request; and
determining the first quantity and the second quantity based on the first weight, the second weight, the total amount of the first data and the total amount of the second data;
causing the first application to process the first quantity of data in the first data using the target resource; and
causing the second application to process the second quantity of data in the second data using the target resource.

14. The non-transitory computer readable medium of claim 13, wherein obtaining the first weight and the second weight comprises:
- monitoring execution performance of at least one of the first application and the second application; and
- obtaining the first weight and the second weight updated based on the execution performance.

15. The non-transitory computer readable medium of claim 14, wherein obtaining the first weight and the second weight updated based on the execution performance comprises:
- providing the execution performance to a user; and
- receiving from the user updates to the first weight and the second weight.

16. The non-transitory computer readable medium of claim 13, wherein determining the first quantity and the second quantity comprises:
- determining whether a utilization ratio of the target resource exceeds a threshold utilization ratio; and in response to determining that the utilization ratio exceeds the threshold utilization ratio, determining the first quantity and the second quantity based on the first request and the second request.

* * * * *